United States Patent [19]

Koshiba et al.

[11] Patent Number: 4,963,463

[45] Date of Patent: Oct. 16, 1990

[54] RADIATION-SENSITIVE RESIN COMPOSITION WITH ADMIXTURES OF O-QUINONE DIAZIDE AND ACID ESTERS HAVING NITROBENZYL OR CYANOBENZYL GROUP

[75] Inventors: Mitsunobu Koshiba; Keiichi Yamada, both of Yokohama; Yoshiyuki Harita, Kawasaki, all of Japan; Bruno Roland, Haveriee; Jan Vandendriesshe, Haasrode, both of Belgium

[73] Assignees: Japan Synthetic Rubber Co., Ltd., Tokyo, Japan; UCB Société Anonyme, Brussels, Belgium

[21] Appl. No.: 310,665

[22] Filed: Feb. 15, 1989

[30] Foreign Application Priority Data

Feb. 22, 1988 [JP] Japan ................................ 63-39334
Aug. 24, 1988 [JP] Japan ............................... 63-208055

[51] Int. Cl.$^5$ .......................... G03F 7/022; G03C 1/60
[52] U.S. Cl. .................................... 430/191; 430/165; 430/192; 430/270; 430/190; 430/325
[58] Field of Search .............. 430/191, 192, 165, 270, 430/190

[56] References Cited

U.S. PATENT DOCUMENTS

| | | | |
|---|---|---|---|
| 3,969,118 | 7/1976 | Stahlhofen et al. | 430/191 |
| 4,160,671 | 7/1979 | Stahlhofen | 430/191 |
| 4,163,672 | 8/1979 | Stahlhofen | 430/191 |
| 4,247,611 | 1/1981 | Sander et al. | 430/191 |
| 4,279,982 | 7/1981 | Iwasaki et al. | 430/191 |
| 4,365,019 | 12/1982 | Daly et al. | 430/191 |
| 4,458,000 | 7/1984 | Stahlhofen | 430/191 |
| 4,467,025 | 8/1984 | Goto et al. | 430/191 |
| 4,701,399 | 10/1987 | Nagano et al. | 430/191 |
| 4,758,497 | 7/1988 | Shah et al. | 430/191 |
| 4,772,534 | 9/1988 | Kawamura et al. | 430/191 |
| 4,840,869 | 6/1989 | Kita et al. | 430/191 |
| 4,857,435 | 8/1989 | Hopf et al. | 430/192 |

*Primary Examiner*—Charles L. Bowers, Jr.
*Attorney, Agent, or Firm*—Oblon, Spivak, McClelland, Maier & Neustadt

[57] ABSTRACT

A radiation-sensitive resin composition comprising a quinonediazide-type radiation-sensitive resin and a compound generating an acid upon irradiation. Said radiation-sensitive resin composition can be used as a resist suitable for dry development by plasma etching and enables one to obtain an etching image having high precision with high reproducibility at a high degree of resolution and selectivity.

12 Claims, No Drawings

RADIATION-SENSITIVE RESIN COMPOSITION WITH ADMIXTURES OF O-QUINONE DIAZIDE AND ACID ESTERS HAVING NITROBENZYL OR CYANOBENZYL GROUP

This invention relates to a radiation-sensitive resin composition and, more particularly, to a radiation-sensitive resin composition which can be used as a resist suitable for dry development by plasma etching.

Conventionally, in processes for producing semiconductor elements such as ICs and LSIs, a photolithographic method has been employed, in which a radiation-sensitive resin composition, such as a negative-type photoresist prepared by blending a polyisoprene-cyclized rubber and a bisazide or a positive-type photoresist obtained by mixing a novolak resin and a quinonediazide-type compound, is coated on a substrate to be processed, exposed to g-line (wave length: 436 nm) or i-line (wave length: 365 nm) from a mercury lamp, and developed by a developing solution to obtain an intended pattern.

In recent years, however, the size of LSIs becomes extremely small, requiring the minimum size of a pattern of less than 1 μm to be formed on a substrate. The problem encountered in forming a pattern with this range of the size is that it is difficult to produce a sufficient resolution due to adverse effects of light reflection in the exposed resist layer and a shallow depth of focus in the exposure system, when the conventional photolithographic method is used. This is specially true in case where the substrate has a highly reflective topography.

In order to avoid this type of problem, a method is known to produce a resist pattern by a photolithographic method wherein the development is effected by etching in anisotropic gas plasma such as oxygen plasma, instead of using wet development.

For example, EP-A-0,184,567 discloses a method for producing a desired negative pattern via. the following steps. A layer of a radiation-sensitive resin, which is either a mixture of a polymeric compound and a photoactive compound or a polymeric compound to which a photo-active compound is bound, is first coated on a substrate. The characteristic of this layer is such that when the area to be irradiated is exposed to visible or ultraviolet light, a silicon compound is selectively diffused in the irradiated area. Only selected areas of this layer of the radiation-sensitive resin are then exposed to visible or ultraviolet light through a mask. This irradiated radiation-sensitive resin layer is treated with a silicon compound so that it may be selectively diffused into the irradiated area and react with the polymer of this area. Finally, the layer of the radiation-sensitive resin thus treated is subjected to dry development by means of anisotropic plasma etching to selectively eliminate the unirradiated area thus obtaining a desired pattern.

As a radiation-sensitive resin to be used in this process, EP-A-0,184,567 discloses a polymer mixed or condensed with quinonediazide. In this type of radiation-sensitive resin, however, the diffusion of and reaction with a silicon compound takes place even at an unirradiated area, and it is difficult to produce a pattern by means of the oxygen plasma etching without producing residues at unirradiated areas. This requires the two-step plasma etching development, i.e., the first etching with an oxygen plasma containing a fluorine-containing gas, and the second etching with a pure oxygen plasma, thus making the dry development process very complicated.

The present inventors have conducted extensive studies in order to solve these problems, and discovered a radiation-sensitive resin composition, which, when used as a resist for dry development and subjected to etching with an oxygen plasma, can provide a high degree of resolution and selectivity.

According to this invention, there is provided a radiation-sensitive resin composition comprising a quinonediazide-type radiation-sensitive resin and a compound generating an acid upon irradiation (said compound is hereinafter referred to as "photoacid").

The quinonediazide-type radiation-sensitive resin (hereinafter referred to simply as "radiation-sensitive resin") used in this invention includes a condensate of a quinonediazide compound with an alkali-soluble resin, a mixture of a quinonediazide compound and an alkali-soluble resin, and the like. These may be used alone or in combination of two or more.

The alkali-soluble resin to be used may be a novolak resin having hydroxyl groups, a hydroxystyrene resin or the like. These may be used alone or in combination of two or more.

In this specification, the term "hydroxystyrene resin" means a polymer or copolymer, at least part of which is composed of hydroxystyrene and/or a hydroxystyrene derivative, and the hydroxystyrene derivative includes alkyl-substituted hydroxystyrenes and the like.

The novolak resin having hydroxyl groups can be synthesized by condensing a hydroxy aromatic compound with an aldehyde compound.

Examples of the hydroxy aromatic compound to be used in the synthesis of a novolak resin having hydroxyl groups are hydroxynaphthalenes such as 1-naphthol, 2-methyl-1-naphthol, 4-methoxy-1-naphthol, 4-ethoxy-1-naphthol, 4-propoxy-1-naphthol, 4-butoxy-1-naphthol, 5-methyl-1-naphthol, 2-ethyl-1-naphthol, 2-propyl-1-naphthol, 2-butyl-1-naphthol and the like; and phenols such as phenol, alkyl phenols (cresol, ethylphenol, butylphenol, xylenol, trimethylphenol and the like), phenylphenol and the like.

These hydroxy aromatic compounds can be used either along or in combination of two or more.

The aldehyde to be employed includes formaldehyde, paraformaldehyde, acetaldehyde, propylaldehyde, benzaldehyde, phenylacetaldehyde, α-phenylpropylaldehyde, β-phenylpropylaldehyde, o-chlorobenzaldehyde, m-chlorobenzaldehyde, p-chlorobrnzaldehyde, o-methylbenzaldehyde, m-methylbenzaldehyde, p-methylbenzaldehyde, p-ethylbenzaldehyde, p-n-butylbenzaldehyde and the like.

In this reaction, the aldehyde is used in an amount usually of 0.7–3 mols, preferably 1.1–2 mols, per mol of the hydroxy aromatic compound.

Either an inorganic acid such as hydrochloric acid, nitric acid or sulfuric acid, or an organic acid such as formic acid, oxalic acid or acetic acid can be employed as a catalyst.

The amount of the acid catalyst is desirably $1 \times 10^{-4} - 5 \times 10^{-1}$ mol per mol of the hydroxy aromatic compound plus the aldehyde.

Water is usually used as a reaction medium in the condensation reaction. A hydrophilic solvent may be used, however, in case where the hydroxy aromatic compound used is insoluble in an aqueous solution of the aldehyde and the reaction system becomes inhomogeneous at the beginning of the reaction.

The hydrophilic solvent to be used for this purpose may be, for instance, an alcohol such as methanol, ethanol, propanol, butanol or the like; a ketone such as acetone, methyl ethyl ketone, methyl isobutyl ketone or the like; or a cyclic ether such as tetrahydrofurane, dioxane or the like.

An appropriate amount of the reaction medium to be employed is generally 50–1,000 parts by weight per 100 parts by weight of the reaction raw materials.

The temperature for the condensation reaction may be suitably determined depending upon the reactivity of the raw materials, although the temperature is generally in the range of 10°–150° C., preferably 70°–130° C.

The temperature of the system is raised to 130°–230° C. at the final stage of the condensation reaction in order to eliminate the unreacted monomers, acid catalyst, and reaction media under a reduced pressure, and to recover the target compound, novolak resin.

Alternatively, the reaction mixture may be dissolved in the above-mentioned hydrophilic solvent and added to a precipitant such as water, n-hexane, n-heptane or the like to recover the novolak resin as a precipitate, which is then separated from the system and dried under heating.

The polystyrene-reduced weight average molecular weight of the novolak resin is usually 200–200,000, preferably 500–100,000, and most preferably 600–50,000.

The following polymers and copolymers may be used as examples of the hydroxystyrene resin which is another type of the alkali-soluble resin to be used in this invention: Polymers or copolymers of at least one monomeric compound selected from hydroxystyrene and derivatives thereof, including hydroxystyrene, α-methyl-m-hydroxystyrene and α-methyl-p-hydroxystyrene; copolymers of hydroxystyrene and/or its derivative with a vinyl monomer other than hydroxystyrene and its derivative, said vinyl monomer being, for example, styrene, vinyl ether, acrylonitrile, vinyl chloride, an acrylic acid ester, maleic anhydride or a vinyl ester of an organic acid; halogenated (iodinated, chlorinated or brominated) hydroxystyrene polymers or copolymers of at least one monomeric compound selected from hydroxystyrene and derivatives thereof; and halogenated (iodinated, chlorinated or brominated) copolymers of hydroxystyrene and/or its derivative with a vinyl monomer other than hydroxystyrene and its derivative.

Among these, particularly preferable are hydroxystyrene polymer, α-methyl-m-hydroxystyrene polymer, α-methyl-p-hydroxystyrene polymer and the like.

The hydroxystyrene resin may usually be prepared by conventional anionic polymerization, cationic polymerization or radical polymerization, though the preparation method is not critical.

The polystyrene-reduced weight average molecular weight of the hydroxystyrene resin is usually 200–200,000, preferably 500–100,000, and most preferably 600–50,000.

The novolak resin and the hydroxystyrene resin can be employed either alone or in combination of two or more. Even other kinds of resins may be used together with them. In this case, however, it is desirable that said other resins be compatible with the novolak resin and the hydroxystyrene resin. Examples of the combination are a combination of a novolak resin with a hydroxystyrene resin and a combination of a novolak resin with an acrylic or methacrylic acid polymer or copolymer.

Given as examples of the quinonediazide compound to be employed for synthesizing a condensate with an alkali-soluble resin according to this invention are quinonediazidosulfonyl halides, including 1,2-naphthoquinonediazidosulfonyl halides, such as 1,2-naphthoquinonediazido-4-sulfonyl chloride, 1,2-naphthoquinonediazido-5-sulfonyl chloride, 1,2-naphthoquinonediazido-6-sulfonyl chloride, 1,2-naphthoquinonediazido-4-sulfonyl bromide, 1,2-naphthoquinonediazido-5-sulfonyl bromide and 1,2-naphthoquinonediazido-6-sulfonyl bormide; and 1,2-benzoquinonediazidosulfonyl halides, such as 1,2-benzoquinonediazido-4-sulfonyl chloride, 1,2-benzoquinonediazido-4 sulfonyl bromide and the like.

These quinonediazide compounds may be used either alone or in combination of two or more.

The condensation ratio of the alkali-soluble resin and the quinonediazide compound is such that the quinonediazido group is present in a proportion of 1–50% by weight, preferably 1–40% by weight and most preferably 1–30% by weight, in the resulting radiation-sensitive resin. If the proportion of quinonediazido group is too small, it is difficult to differentiate the quantity of the silicon compound to be diffused and reacted in the irradiated area and the unirradiated area of the coated film when the condensate is used as a resist for dry development. On the other hand, if the proportion is too large, the substantial portion of quinonediazido group remains unreacted when irradiated for a short period of time, thus precluding the diffusion and reaction of a silicon compound at the irradiated areas.

The condensation reaction of an alkali-soluble resin with a quinonediazide compound is carried out in a suitable solvent using a base catalyst.

Given as examples of the solvent used in this reaction are acetone, dioxane, ethyl acetate, propylene glycol monomethyl ether acetate, acetonitrile, methyl ethyl ketone, diisobutyl ketone, methyl isobutyl ketone, ethylene glycol monomethyl ether acetate, ethylene glycol monoethyl ether acetate, ethylene glycol monopropyl ether acetate, ethylene glycol monobutyl ether acetate, ethylene glycol monomethyl ether, ethylene glycol monoethyl ether, ethylene glycol dimethyl ether, and ethylene glycol diethyl ether, as well as mixtures of these solvents. These solvents are used in an amount usually of 100–10,000 parts by weight, preferably 200–3,000 parts by weight, per 100 parts by weight of the alkali-soluble resin plus the quinonediazide compound.

The base catalyst may be an alkali metal salt such as sodium bicarbonate, sodium carbonate, potassium bicarbonate, potassium carbonate or the like, an alkali metal hydroxide such as sodium hydroxide, potassium hydroxide or the like; an amine such as triethylamine, trimethylamine, triethanolamine, tributylamine, monoethanolamine, pyridine or the like; an ammonium compound such as ammonium hydroxide or the like. The base catalyst is used in an amount usually of 0.1–100 parts by weight, preferably 1–50 parts by weight, per 100 parts by weight of the alkali-soluble resin plus the quinonediazide compound.

The condensation reaction is usually conducted at a temperature of 10°–50° C., preferably 20°–40° C., and in most cases, the reaction completes in 15 minutes—10 hours.

After completion of the reaction, the reaction mixture is put into a large amount of water, or an acidic aqueous solution containing hydrochloric acid, sulfuric acid or the like to remove the base catalyst. Alternatively, the base catalyst is eliminated by neutralization and the condensate is recovered as a precipitate.

To 100 parts by weight of this condensate may be added less than 100 parts by weight of a quinonediazide compound for forming a mixture with the alkali-soluble resin as hereinbelow illustrated, or less than 900 parts by weight of the alkali-soluble resin.

The quinonediazide compound for forming a mixture with the alkali-soluble resin may be, for example, a (poly)hydroxybenzene such as p-cresol or pyrogallol, a (poly)hydroxyphenyl alkyl ketone such as 2,4-dihydroxyphenylpropyl ketone, 2,3,4-trihydroxyphenyl n-hexyl ketone, 2,3,4-trihydroxybenzophenone, 2,4,6-trihydroxybenzophenone or 2,3,4,4'-tetrahydroxybenzophenone; a quinonediazidosulfonic acid ester such as an ester of a (poly)hydroxyaryl ketone with 1,2-quinonediazido-4-sulfonic acid or 1,2-quinonediazido-5-sulfonic acid; or the like.

Beside these quinonediazide compounds, the quinonediazidosulfonic acid esters mentioned in "Light-Sensitive Systems: by J. Kosar, 339-352 (1965), John Wiley & Sons (New York) and "Photoresist" by W. S. DeForest, 50, (1975), McGraw-Hill, Inc., (New York) can be used.

The amount of the quinonediazide compound to be compounded is usually 10-50 parts by weight, preferably 15-45 parts by weight, per 100 parts by weight of the alkali-soluble resin.

In this invention, it is desirable to use the condensate of the quinonediazide compound with the alkali-soluble resin as the radiation-sensitive resin.

The photoacid used in this invention means such a compound generating an inorganic or organic acid upon irradiation with ultraviolet light, far-ultraviolet light, X-rays, electron beams, visible light or the like. Said inorganic acids are, for example, phosphoric acid, iodic acid, hydrogen halides and the like, and said organic acids include sulfonic acids, diazosulfonic acid, nitrobenzylsulfonic acid, cyanobenzylsulfonic acid, nitrobenzylcarboxylic acid, cyanobenzylcarboxylic acid, nitrobenzylphosphoric acid, cyanobenzylphosphoric acid, nitrobenzylnitric acid, cyanobenzylnitric acid and the like. Specific examples of the photoacids are oniums such as sulfonium, phosphonium, iodonium and diazonium; nitrobenzyl halides; halogenated hydrocarbons; nitrobenzylsulfonic acid esters such as phenyl nitrobenzylsulfonate, naphthol nitrobenzylsulfonate, o-nitrobenzyl 9,10-diethoxyanthracene-2-sulfonate, p-nitrobenzyl 9,10-diethoxyanthracene-2-sulfonate, o-nitrobenzyl 9,10-dimethoxyanthracene-2-sulfonate, p-nitrobenzyl 9,10-dimethoxyanthracene-2-sulfonate, o-nitrobenzyl 9,10-dipropoxyanthracene-2-sulfonate, p-nitrobenzyl 9,10-dipropoxyanthracene-2-sulfonate, benzointosylate, 2-methylbenzointosylate and the like; cyanobenzylsulfonic acid esters such as phenyl cyanobenzylsulfonate and naphthyl cyanobenzylsulfonate; nitrobenzylcarboxylic acid esters such as phenyl nitrobenzylcarboxylate and naphthyl nitrobenzylcarboxylate; cyanobenzylcarboxylic acid esters such as phenyl cyanobenzylcarboxylate and naphthyl cyanobenzylcarboxylate; nitrobenzylphosphoric acid esters such as phenyl nitrobenzylphosphate and naphthyl nitrobenzylphosphate; cyanobenzylphosphoric acid esters such as phenyl cyanobenzylphosphate and naphthyl cyanobenzylphosphate; nitrobenzylnitric acid esters such as phenyl nitrobenzylnitrate and naphthyl nitrobenzylnitrate; cyanobenzylnitric acid esters such as phenyl cyanobenzylnitrate and naphthyl cyanobenzylnitrate; and the like. Among these, preferred are o-nitrobenzyl 9,10-diethoxyanthracene-2-sulfonate, p-nitrobenzyl 9,10-diethoxyanthracene-2-sulfonate, o-nitrobenzyl 9,10-dimethoxyanthracene-2-sulfonate, p-nitrobenzyl 9,10-dimethoxyanthracene-2-sulfonate, o-nitrobenzyl 9,10-dipropoxyanthracene-2-sulfonate, p-nitrobenzyl 9,10-dipropoxyanthracene-2-sulfonate, benzointosylate, 2-methylbenzointosylate and the like. The amount of the photoacid to be used is usually 0.01-40 parts by weight, preferably 0.1-10 parts by weight, per 100 parts by weight of the radiation-sensitive resin.

A photosensitizer can be added to the radiation-sensitive resin composition of this invention. The photosensitizers to be employed include pyrrole, imidazole, pyrazole, triazole, indole, benzimidazole, benzotriazole, naphthotriazole, dimethyl urea, pyrrolidone, oxyindole, imidazolidone, benzimidazolidone, imidazolidinethione, oxazolidone, benzoxazolidone, pyrazolone, isatin, oxazolidinedione, glutarimide, piperidone, 2H-pirido-[3,2,b][1,4]oxazin-3[4H]one, 10H-pirido-[3,2,b][1,4]-benzothiadine, urazol, hydantoin, barbituric acid, glycine, alloxan, and other nitrogen-containing compounds or their halogenated derivatives. The amount of the photosensitizer to be used is usually less than 40 parts by weight, preferably 2-10 parts by weight, per 100 parts by weight of the radiation-sensitive resin.

A surfactant may be added to the radiation-sensitive resin composition of this invention to improve the coating ability such as striation. The surfactant to be employed includes nonionic surfactants including polyoxyethylene alkyl ethers such as polyoxyethylene lauryl ether, polyoxyethylene stearyl ether and polyoxyethylene oleyl ether, polyoxyethylene alkylphenyl ethers such as polyoxyethylene octylphenyl ether and polyoxyethylene nonylphenyl ether, polyethylene glycol dialkyl esters such as polyethylene glycol dilaurate and polyethylene glycol distearate; fluorine-containing surfactants containing a fluoroalkyl or perfluoroalkyl group such as Efftop EF301, EF303 and EF352 (manufactured by Shinakitakasei Co., Ltd.), Megafac F171, F172 and F173 (manufactured by Dainippon Ink Co., Ltd.), Asahiguard AG710 (manufactured by Asahi Glass Co., Ltd.), Florade FC430 and FC431 (manufactured by Sumitomo 3M Co., Ltd.), and Surflone S-382, SC101, SC102, SC103, SC104, SC105 and SC106 (manufactured by Asahi Glass Co., Ltd.); organosiloxane polymer KP341 (manufactured by Shinetsu Kagaku Kogyo Co., Ltd.); acrylic acid- or methacrylic acid-type polymers and copolymers such as Polyflow No. 75, No. 95 and WS (manufactured by Kyoeisha Yushikagaku Kogyo Co., Ltd.); and the like. The amount of the surfactant to be added is usually less than 2 parts by weight, preferably 0.005-1 part by weight, per 100 parts by weight of the abovementioned condensate.

In addition, dyes or pigments or adhesion promoters may be further added to the radiation-sensitive resin composition of this invention so that potential images of the irradiated areas can be made visible or adverse effects by halation during irradiation may be minimized, or in order to improve the adhesion property of the composition. Dyes which can be used for this purpose include oil-soluble dyes, dispersible dyes, basic dyes, methine-type dyes and hydroxyazo-type dyes. More specifically, these dyes may be Noepengelb 075 (manufactured by BASF A.G.), Neosabongelb 073 (ibd.), Solvent Yellow 162, Macrolex Yellow, hydroxyazobenzene and the like. As examples of the adhesion promoters, silicon compounds such as 3-aminopropyltriethoxysilane, vinyltrichlorosilane and 2-(3,4-epoxycyclohexylethyl)trimethoxysilane may be given.

Furthermore, antioxydants or defoaming agents can be compounded as required to the radiation-sensitive resin composition of this invention.

The radiation-sensitive resin composition according to this invention can be prepared by dissolving a radiation-sensitive resin, a photoacid and, as required, various additives, in an organic solvent.

The organic solvents employed for this purpose include glycol ethers such as ethylene glycol monomethyl ether, diethylene glycol monomethyl ether, ethylene glycol monoethyl ether, diethylene glycol monoethyl ether, diethylene glycol dibutyl ether, diethylene glycol dimethyl ether, propylene glycol monomethyl ether acetate and the like; Cellosolve esters such as methyl Cellosolve acetate, ethyl Cellosolve acetate and butyl Cellosolve acetate; aromatic hydrocarbons such as toluene and xylene; ketones such as methyl ethyl ketone, methyl isobutyl ketone, cyclohexanone, cyclopentanone, acetonylacetone, acetophenone, isophorone and the like; ethers such as benzyl ethyl ether, 1,2-dibutoxyethane and dihexyl ether; fatty acids such as caproic acid, caprylic acid and the like; alcohols such as 1-octanol, 1-nonanol, 1-decanol, banzyl alcohol and the like; esters such as ethyl acetate, butyl acetate, isoamyl acetate, 2-ethylhexyl acetate, benzyl acetate, benzyl benzoate, diethyl oxalate, dibutyl oxalate, diethyl malonate, ethyl lactate, methyl lactate, propyl lactate, butyl lactate, dimethyl maleate, diethyl maleate, dibutyl maleate, dibutyl phthalate, dimethyl phthalate, ethylene carbonate, propylene carbonate and the like; cyclic lactones such as γ-butyrolactone; and urea derivatives such as dimethylimidazolidinone.

These organic solvents may be used alone or in combination of two or more.

In order to apply the radiation-sensitive resin composition of this invention in the form of a resist solution to a substrate, the solution is dissolved in the above-mentioned organic solvent so that the concentration of the radiation-sensitive resin composition becomes 5-50% by weight, and the resulting solution is then applied to the substrate by means of spin coating, flow coating or roll coating.

The invention is hereinafter illustrated in more detail by way of examples, which should be, by no means, construed as limiting the present invention.

EXAMPLE 1

A separable flask equipped with a stirrer, a condenser and a thermometer was charged with 102 g of phenol, 18 g of t-butylphenol, 92 ml of a 37% aqueous formaldehyde solution and 0.04 g of oxalic acid. The flask was soaked in an oil bath with stirring and the reaction was conducted at 100° C. for 3.5 hours.

Then, the temperature of the oil bath was raised to 180° C., at which temperature the internal pressure was reduced to remove water and unreacted phenol, t-butylphenol, formaldehyde and oxalic acid, and recover the novolak resin.

This novolak resin weighing 25 g and 5 g of 1,2-naphthoquinone-(2)-diazo-5-sulfonic acid chloride were dissolved in 230 g of acetone. To the solution was added 2.8 g of triethylamine, and the resulting mixture was subjected to condensation at 40° C. for 1 hour with stirring. The reaction mixture was then charged dropwise to 5 liters of a 0.04% aqueous hydrochloric acid solution to solidify the condensate.

This condensate was washed with water, dissolved again in 230 g of acetone, and administered to 5 liters of the same aqueous hydrochloric acid solution to solidify the condensate.

This precipitation of the condensate was repeated three times in total, after which the resin obtained was dried at 40° C. for 48 hours to give the intended condensate.

Thirty (30) g of this condensate was dissolved in 60 g of ethylene glycol monoethyl ether acetate, and to this solution was added 1 g of phenyl nitrobenzylsulfonate. A resist solution was prepared by subjecting the mixed solution thus obtained to filtration using a 0.2 μm pore size membrane filter. The solution was applied on a silicon wafer using a spinner at a spin speed of 3,000 rpm to form a thin film of a 1.7-μm thickness after prebake. The film was dried in a air convection oven and prebaked at 90° C. for 30 minutes. The silicon wafer was irradiated with ultraviolet light (g-line) through a reticle pattern using a Nikon NSR-1505 G4D (manufactured by Nippon Kogaku Co., Ltd.). After the irradiation, the silicon wafer was treated with hexamethyldisilazane vapor at 130° C. for 3 minutes.

The silicon wafer thus obtained was placed in a magnetron-enhanced reactive ion etching equipment (ARIES; manufactured by MRC Corp.) and was developed by oxygen-reactive ion etching to give a resist pattern thereon, in which a vertical wall with the minimum line-width of 0.5 μm was formed in the irradiated area.

COMPARATIVE EXAMPLE 1

A photoresist solution was prepared in the same manner as in Example 1, except that phenyl nitrobenzylsulfonate was not added. The solution was applied to a silicon wafer, prebaked, irradiated with ultraviolet light, treated with hexamethyldisilazane vapor and developed by oxygen-reactive ion etching. Areas not irradiated with ultraviolet light remained on the surface, failing to obtain a resist pattern.

EXAMPLE 2

In 60 g of ethylene glycol monoethyl ether acetate was dissolved 30 g of a condensate of 1,2-naphthoquinone-(2)-diazo-5-sulfonic chloride with a novolak resin synthesized in the same manner as in Example 1, and to the resulting solution was added 0.9 g of p-nitrobenzyl 9,10-diethoxyanthracene-2-sulfonate. The resulting mixture was filtered through a mambrane filter having a pore diameter of 0.2 μm to prepare a resist solution.

In the same manner as in Example 1, this resist solution was applied on a silicon wafer, prebaked, irradiated with ultraviolet light, treated with hexamethyldisilazane vapor and then developed by oxygen-reactive ion etching, thereby obtaining a resist pattern in which a vertical wall with the minimum line-width of 0.5 μm was formed in the irradiated area. Also, the thickness of the resist pattern was 95% based on that before irradiation.

The radiation-sensitive (resin) composition of this invention, when used as a resist for dry development, promotes diffusion and reaction of a silicon compound selectively at irradiated areas, due to presence of an acid which is generated upon irradiation. This brings about a high degree of resolution and selectivity of etching, and provides an etching image at high precision and with excellent reproducibility.

The present composition, therefore, is capable of increasing integration of semiconductor elements such as ICs and promoting the device yield.

What is claimed is:

1. A radiation-sensitive resin composition comprising in admixture a quinonediazide-type radiation-sensitive resin wherein the quinonediazide-type radiation-sensitive resin is at least one member selected from the group consisting of a condensate of a quinonediazide compound with an alkali-soluble resin and a mixture of a quinonediazide compound and an alkali-soluble resin and as a compound generating an acid upon irradiation a member selected from the group consisting of nitrobenzylsulfonic acid esters, cyanobenzylsulfonic acid esters, nitrobenzylcarboxylic acid esters, nitrobenzylphosphoric acid esters, nitrobenzylnitric acid esters and cyanobenzylnitric acid esters; said radiation-sensitive resin and said compound generating an acid being present in an amount effective to provide a photosensitive resist pattern.

2. The radiation-sensitive resin composition according to claim 1, wherein the alkali-soluble resin is at least one member selected from the group consisting of a novolak resin having hydroxyl groups and a hydroxystyrene resin.

3. The radiation-sensitive resin composition according to claim 2, wherein the hydroxystyrene resin is at least one member selected from the group consisting of halogenated or unhalogenated polymers and copolymers of at least one compound selected from hydroxystyrene and derivatives thereof and copolymers of at least one compound selected from hydroxystyrene and its derivatives with at least one other vinyl monomer.

4. The radiation-sensitive resin composition according to claim 3, wherein the derivatives of hydroxystyrene include α-methyl-m-hydroxystyrene and α-methyl-p-hydroxystyrene and the at least one other vinyl monomer is selected from the group consisting of styrene, vinyl ether, acrylonitrile, vinyl chloride, acrylic acid esters, maleic anhydride and vinyl esters of organic acids.

5. The radiation-sensitive resin composition according to claim 2, wherein the hydroxystyrene resin is a hydroxystyrene polymer, α-methyl-m-hydroxystyrene polymer or β-methyl-p-hydroxystyrene polymer.

6. The radiation-sensitive resin composition according to claim 1, wherein the quinonediazide compound to be condensed with the alkali-soluble resin is selected from the group consisting of 1,2-naphthoquinonediazido-4-sulfonyl chloride, 1,2-naphthoquinonediazido-5-sulfonyl chloride, 1,2-naphthoquinonediazido-6-sulfonyl chloride, 1,2-naphthoquinonediazido-4-sulfonyl bromide, 1,2-naphthoquinonediazido-5-sulfonyl bromide, 1,2-naphthoquinonediazido-6-sulfonyl bromide, 1,2-benzoquinonediazido-4-sulfonyl chloride and 1,2-benzoquinonediazido-4-sulfonyl bromide.

7. The radiation-sensitive resin composition according to claim 1, wherein the condensation ratio of the alkali-soluble resin and the quinonediazide compound is such that the quinonediazido group is present in a proportion of 1–50% by weight in the resulting radiation sensitive resin.

8. The radiation-sensitive resin composition according to claim 1, wherein the quinonediazide compound to be mixed with the alkali-soluble resin is selected from the group consisting of condensates of (poly)hydroxybenzenes, (poly)hydroxyphenyl alkyl ketones and quinonediazidosulfonic acid esters with 1,2-quinonediazido-4-sulfonic acid or 1,2-quinonediazido-5-sulfonic acid.

9. The radiation-sensitive resin composition according to claim 1, wherein the amount of the quinonediazide compound to be mixed with the alkali-soluble resin is 10–50 parts by weight per 100 parts by weight of the alkali-solible resin.

10. The radiation-sensitive resin composition according to claim 1, wherein the nitrobenzylsulfonic acid esters include o-nitrobenzyl 9,10-diethoxyanthracene-2-sulfonate, p-nitrobenzyl 9,10-diethoxyanthracene-2-sulfonate, o-nitrobenzyl 9,10-dimethoxyanthracene-2-sulfonate, p-nitrobenzyl 9,10-dimethoxyanthracene-2-sulfonate, o-nitrobenzyl 9,10-dipropoxyanthracene-2-sulfonate, p-nitrobenzyl 9,10-dipropoxyanthracene-2-sulfonate, benzointosylate and 2-methylbenzointosylate.

11. The radiation-sensitive resin composition according to claim 1, wherein the compound generating an acid upon irradiation is contained in an amount of 0.01–40 parts by weight per 100 parts by weight of the quinonediazide-type radiation-sensitive resin.

12. The composition according to claim 1 wherein the compound generating an acid upon irradiation is a nitrobenzylsulfonic acid ester.

* * * * *

UNITED STATES PATENT AND TRADEMARK OFFICE
CERTIFICATE OF CORRECTION

PATENT NO. : 4,963,463
DATED : OCTOBER 16, 1990
INVENTOR(S) : Mitsunobu KOSHIBA et al It is certified that error appears in the above-identified patent and that said Letters Patent is hereby corrected as shown below:

ON THE TITLE PAGE:

"[21] Appl. No.: 310,665" should read

--[21] Appl. No.: 310,655--.

Signed and Sealed this

Twenty-fourth Day of November, 1992

Attest:

DOUGLAS B. COMER

*Attesting Officer*  *Acting Commissioner of Patents and Trademarks*